Oct. 7, 1958
J. C. MACE ET AL
2,854,702
COTTON OPENER AND CLEANER
Filed March 11, 1953
3 Sheets-Sheet 1
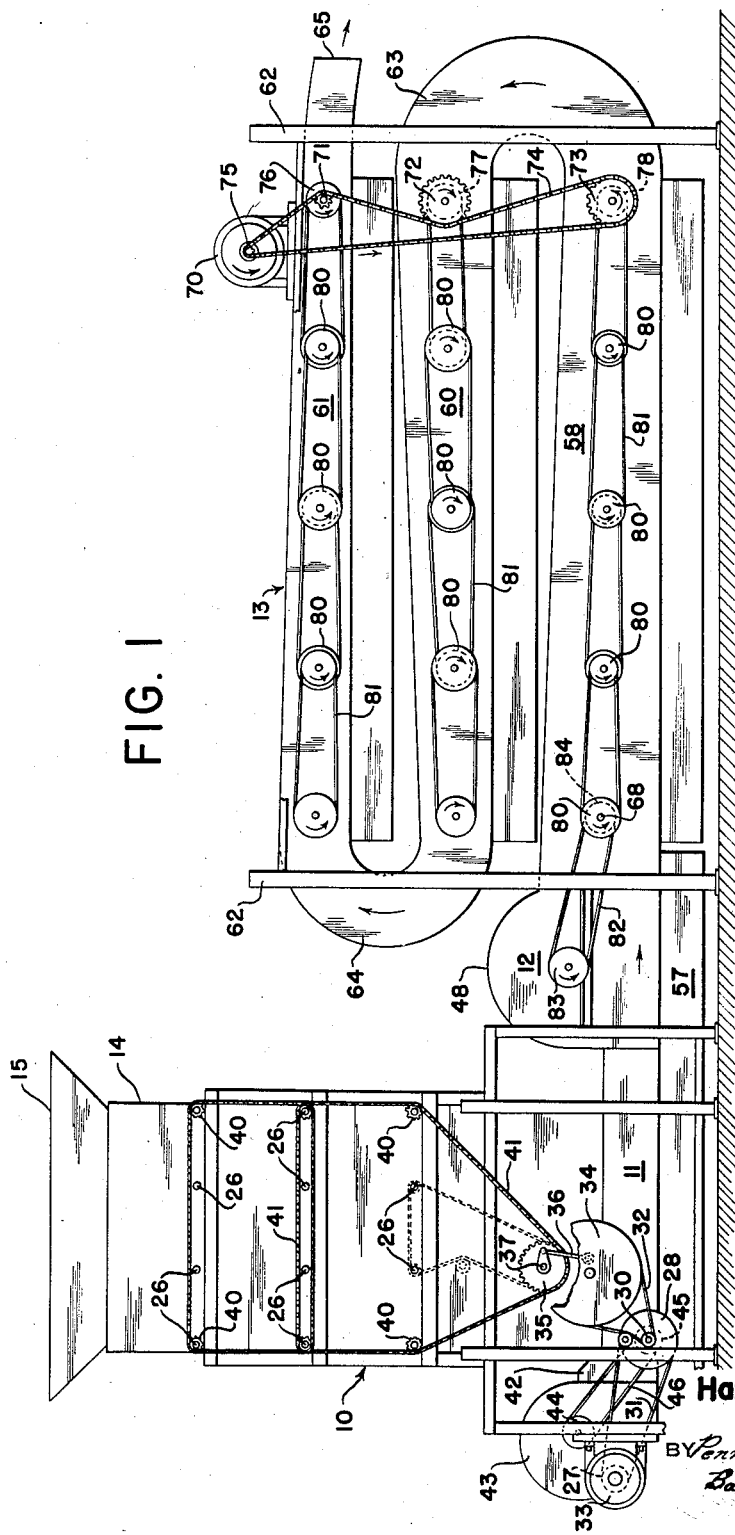
INVENTORS
James C. Mace
Hazel M. Turner
BY Pennie, Edmonds, Morton,
Barrows, & Taylor
ATTORNEYS Oct. 7, 1958  J. C. MACE ET AL  2,854,702
COTTON OPENER AND CLEANER
Filed March 11, 1953  3 Sheets-Sheet 2
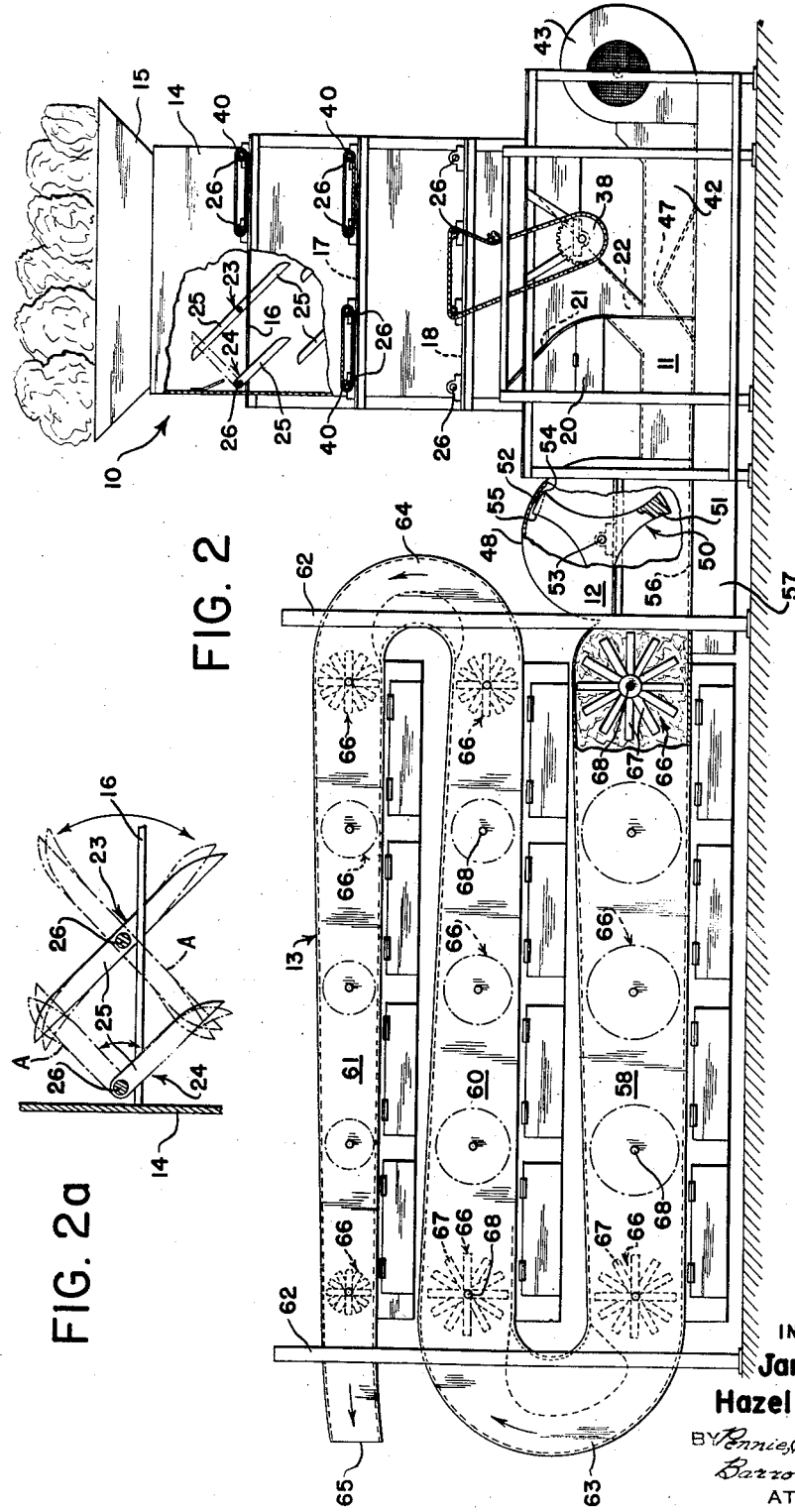
INVENTORS
James C. Mace
Hazel M. Turner Oct. 7, 1958
J. C. MACE ET AL
2,854,702
COTTON OPENER AND CLEANER
Filed March 11, 1953
3 Sheets-Sheet 3
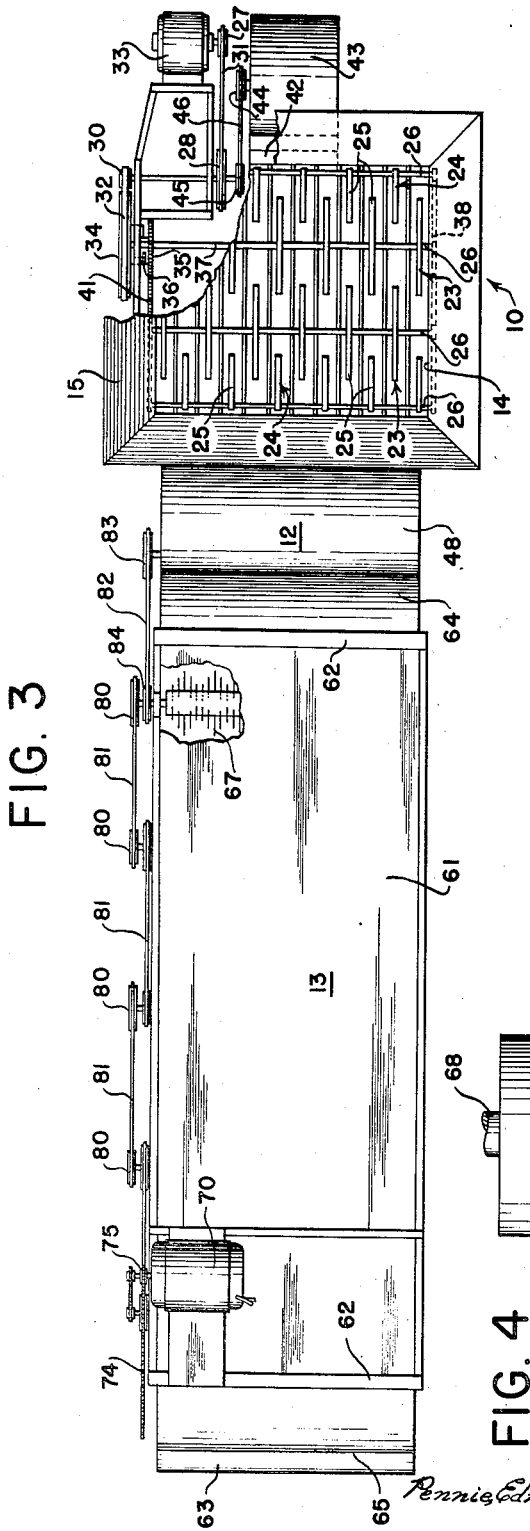
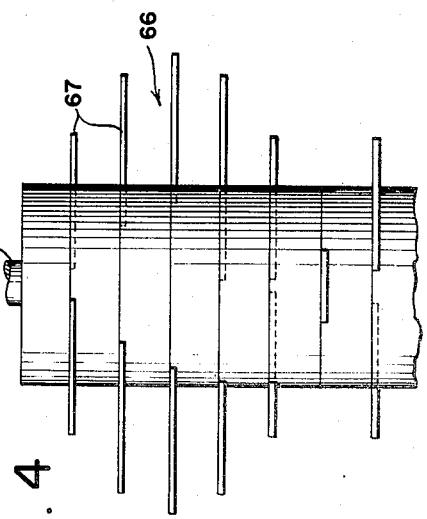
INVENTORS
James C. Mace
Hazel M. Turner
BY
Pennie, Edmonds, Morton, Barrows & Taylor
ATTORNEYS

United States Patent Office 2,854,702
Patented Oct. 7, 1958

2,854,702

COTTON OPENER AND CLEANER

James C. Mace, Charlottesville, and Hazel M. Turner, Ivy, Va., assignors to Institute of Textile Technology, Charlottesville, Va., a corporation of Virginia Application March 11, 1953, Serial No. 341,716

11 Claims. (Cl. 19—76)

This invention relates to apparatus for opening and cleaning compacted and trashy masses of fibrous materials such as cotton.

Prior to our invention, machines for opening and cleaning masses of cotton fibres as they come from the bale have relied upon subjecting the fibres to a large number of heavy blows or to a violent tearing and stretching action as they are held between rolls. These operations, either separately or as successive steps in the opening and cleaning process have an extremely deleterious effect on the fibres in that they break and shorten the fibres, thereby reducing the strength and quality of the cotton. Any attempt to reduce this effect by decreasing the amount of beating and tearing inevitably results in insufficient blooming of the fibres and a smaller amount of field trash being removed from them. The only solution to this dilemma, where machines of the prior art are used, is an unsatisfactory compromise which obtains essential cleaning before the staple of the cotton is reduced excessively.

We have invented cotton opening and cleaning apparatus which does not subject the cotton fibres to violent beating and tearing action as they are rigidly held, but rather which efficiently blooms and cleans the fibres as they are carried through the apparatus substantially in air suspension.

According to our invention, compacted masses of trashy cotton fibres delivered by the usual blender or taken directly from the bale are introduced into the first of a series of connected enclosures. In each of these enclosures are located combs and bladed rotors. The combs oscillate and the rotors rotate about their longitudinal axes while the fibres are carried past them by the air stream. The blades of the several combs and rotors strike the masses of fibres and tend to increase instantaneously the momentum of portions of each mass of fibres, thereby setting up inertial forces between the fibres which tend to stretch them apart at their points of least entanglement.

There are also provided sets of grid bars which cooperate with the oscillating combs. The masses of cotton are combed through the grid bars to produce a relatively gentle stretching and disentangling action. As the fibres are separated, entangled field trash is freed from them. Having greater density than the fibres themselves, the pieces of trash drop out of the air stream and through perforated covers of trash boxes suitably located beneath the course of the cotton through the opener and cleaner.

It is a feature of our novel opening and cleaning apparatus that the cotton is permitted to follow its own line of least resistance through the apparatus thereby resulting in the least damage to the fibres while the fibres are efficiently cleaned and bloomed or opened.

Other features of our invention will appear in the course of the following description of one embodiment which is apparatus currently in successful operation. The description will be readily understood if reference is made to the accompanying drawings. In these drawings:

Fig. 1 is a front elevation, partly broken away, of a cotton opener and cleaner.

Fig. 2 is a rear elevation, partly broken away, of the cotton opener and cleaner of Fig. 1.

Fig. 2a is an enlarged view of a portion, generally indicated at A, of the opener and cleaner of Fig. 2.

Fig. 3 is a plan view, partly broken away, of the cotton opener and cleaner of Fig. 2.

Fig. 4 is a plan view of an opener rotor.

Fig. 5 is a perspective view of a lickerin rotor.

Referring now to Fig. 1 the apparatus comprises four principal sections which are the opener indicated generally at 10, the diffuser at 11, the lickerin at 12, and the cleaner at 13.

As is well known in the art, the operations of opening and cleaning occur, to a large extent, simultaneously; that is, the trash inevitably included in the baled cotton is freed from the fibres as they are pulled apart and bloomed. However, we shall use the terms "opener" and "cleaner" to refer to particular portions of the apparatus as indicated above.

The opener comprises a casing 14 of rectangular cross-section, as shown in Fig. 3, and is provided with an intake opening surrounded by a hopper 15 at the top. Disposed at three levels within this casing are horizontal grids 16, 17 and 18. Beneath the lowermost grid 18 are trash boxes 20, the inclined covers 21 of which are perforated or made of screen to permit the passage of trash therethrough. These trash boxes are so disposed in the lower part of casing 14 as to form an inclined, funnel-like discharge opening 22 in the bottom thereof.

Rotatably mounted immediately above and transversely of each grid are a plurality of double combs 23 and single combs 24. These combs have blades 25 which mesh with and pass through grids as the combs are oscillated about the axes of their horizontal shafts 26, through an arc which extends about 60° above and below the grid with which the particular combs are associated. Oscillation of the combs is effected by a driving system which will now be described.

Through pulleys 27, 28, and 30 and V-belts 31 and 32, drive motor 33 drives crank wheel 34 with a full rotary motion. Crank wheel 34 in turn drives main drive sprocket 35 with an oscillating motion through a connecting rod 36 eccentrically connected to both the crank wheel and the drive sprocket. The shaft 37 on which the main drive sprocket is mounted extends through the casing 14 and has a secondary drive sprocket 38 mounted on the back end thereof.

The shafts of each of the combs 23 and 24 extend through the front and rear walls of the casing 14. The front and rear ends of these shafts are fitted with sprockets 40 which are suitably driven by rack chains 41 coupled to the main and secondary drive sprockets. Thus, the combs are made to oscillate between the positions shown in solid and broken outline at A in Fig. 2.

The construction of the blades 25 of each comb is such that the moment of inertia of the cross-section of a blade perpendicular to its length is less about the axis perpendicular to the shaft 26 of the comb than the moment of inertia of the cross-section about the axis parallel to the shaft. However the thickness of each blade is adjusted to provide a stiffness of the blades which minimizes but preferably does not entirely eliminate vibration in a direction parallel to the shaft of the comb. However, the frequency of oscillation of the combs is made such that the inertial forces imposed on the blades at the extremes of their arcs of oscillation cause the outer ends of the blades to carry beyond their normal static positions as is shown in dotted outline in Fig. 2a. This causes a vigorous whipping action of the blades as the direction of rotation of the combs is rapidly reversed at the ends of their arcs of oscillation. The result of this whipping action is a highly efficient opening and cleaning action by inertial separation of the fibres.

There is provided a diffuser trunk 42 having a blower 43, driven by motor 33 through pulleys 44 and 45 and V-belt 46, connected at one end of the trunk. This trunk underlies the opener casing and has a port which connects with the discharge opening 22 of the casing 14. A converging-diverging throat section 47 of the trunk 42 on the blower side of the discharge opening 22 serves to increase the air stream velocity past the opening. The high velocity of the air stream results in a reduced static pressure in the opening 22 which in turn induces a down draft of air through the opener casing 14 and into the trunk 42. The design of the throat 47 is adapted by conventional means to effect a smooth flow of air through the trunk away from the blower.

The end of the diffuser trunk 42 away from the blower 43 connects to the housing 48 of the lickerin section 12. Rotatably journaled within the casing is the lickerin rotor 50. This rotor has, in this particular apparatus, three blades 51, each of which has a face 52 extending the full length of the housing 48 parallel to the shaft 53 of the rotor. The leading edge or toe 54 of each blade is at a greater radial distance from the axis of the shaft than is the trailing edge or heel 55. Situated beneath the rotor is a perforated plate 56 which is the cover of a trash box 57.

The discharge of the lickerin connects with cleaner 13 which comprises three elongated ducts 58, 60 and 61 supported in a suitable frame 62 and joined together in series by U-shaped connecting ducts 63 and 64 to form one continuous duct having the serpentine shape shown in Figs. 1 and 2. This serpentine shape is not essential to the invention, but is merely a convenient and compact form which requires less floor space than would be necessary if the ducts were disposed in a straight line along the floor.

The cross-sections of these ducts are rectangular and constantly diminish in height from the end where duct 58 is connected to the lickerin housing 48 to the discharge end 65 of duct 61. Disposed in tandem within each of these ducts are five bladed rotors 66—fifteen in all—each of which is rotatably mounted transversely of its duct.

The blades 67 on each cleaner rotor are closely spaced along the shaft, extend radially from the rotor shaft, and each blade is angularly displaced from the blade next adjacent by about 30°, although this angle is not critical. Thus, the configuration of the complete rotor is that of a spiral. The diameter of each rotor is made slightly less than the height of the cross-section of the duct at the rotor location to provide clearance for free rotation of the rotor.

The rotors in the several ducts are driven in a direction which will impel the cotton passing beneath them in the direction of the discharge opening 65 of the cleaner duct; that is, the rotors in the upper and lower ducts 58 and 61 as shown in Fig. 1 are driven counter-clockwise while the rotors in the middle duct 60 are driven clockwise. This is effected by motor 70 acting through a combination chain and sprocket and V-belt and pulley system. Fixed to extensions of the rotor shafts of those rotors furthest from the lickerin section in each duct, are sprockets 71, 72, 73 driven by a rack chain 74 engaging a driving sprocket 75 on the shaft of motor 70. Also mounted on each of the shafts carrying sprockets 71, 72 and 73 is a driving pulley 76, 77 and 78 respectively. Similar extensions of all other rotor shafts have fixed thereto dual driven-driving pulleys 80, and the driving pulley on one rotor shaft is engaged by a V-belt 81 to drive the driven pulley of the next succeeding rotor. The ratios of the number of teeth on the drive sprocket 71 to the numbers of teeth on the driven sprockets 71, 72 and 73 and the ratios of the effective diameters of the driving pulleys 76, 77 and 78 to the driven pulleys 80 are such that the peripheral or blade tip speeds of any two successive rotors 66 will vary inversely as the ratio of the cross-sectional areas of the ducts 58, 60 and 61 at the locations of the respective rotors. The lickerin rotor is driven through a V-belt 82 and pulley 83 by the driving pulley 84 on the shaft 68 of the cleaner rotor nearest the lickerin in the duct 58.

It is seen that this driving system effects a continuously increasing tip speed from one rotor to the next along the duct in the direction of the discharge end 65 thereof. This is accompanied by a constantly increasing air stream velocity in the duct since the cross-section of the duct is constantly diminishing in area in the direction of the discharge end of the duct.

It is to be noted here that the seemingly precise relation, set forth above, between rotor speed and cross-sectional area of the duct is not a critical characteristic of our invention, but is rather in the nature of an approximation which may be varied to achieve the best results. Furthermore, the particular form of driving system described is the one presently in use, but any other system which produces the incremental relation between the blade tip speeds of successive rotors may be used.

*Operation*

Compacted and trashy masses of cotton fibres are delivered into the hopper 15 of the opener section 10 from a conventional blender or directly from the bale, and are drawn downwardly through the opener, in part by gravity and in part by the air stream resulting from the reduced static pressure induced at the discharge opening 22 of the opener casing 14. The masses of cotton fibres are agitated by the blades 25 of the oscillating combs 23 and 24 and are subjected to a vigorous whipping action by the blades which results in inertial separation of the fibres and trash as explained above. On the downward stroke of the blades the cotton masses are combed and stretched through the grid bars and delivered into the space below them. This action is repeated at each succeeding tier of grid bars and its associated combs. Inasmuch as the grid bars of each succeeding tier are more closely spaced than the last, the fibres are subjected to successively finer cleaning and stretching action. As the fibres are drawn apart and disentangled the field trash is loosened and due to its density being generally greater than that of the cotton it tends to fall through to the perforated cover plates of the trash boxes and into the trash boxes while the less dense cotton fibres are carried over the cover plates and out through the discharge opening by the air stream. These trash boxes as well as all others in the apparatus are provided with air tight clean out doors through which trash may be removed from time to time as it accumulates.

The range of frequencies of oscillation of the opener combs for most efficient cleaning is relatively broad and is subject to a number of factors. Since the cotton is not rigidly held as in conventional openers and cleaners, there is less danger that it will be damaged by high speed operation of the combs. Therefore, the practical upper limit on the frequency of oscillation of the combs in a particular opener is governed by the whipping of the blades and must not be so high that the blades 25 of combs 24 strike the walls of the casing 14. In this particular apparatus the maximum frequency is about 140 C. P. M. At much lower frequencies the cotton is drawn through the opener without being struck many times by the blades, and at higher frequencies the deflection of the blades as they reverse their direction of rotation at the ends of their arcs of oscillation becomes so great that the blades of the combs 24 strike the walls of the casing 14.

Upon passing through the discharge opening 22 of the opener and entering the air stream in the diffuser trunk 11, the partially opened and cleaned masses of cotton fibres are generally distributed over the whole cross-section of the diffuser trunk and are borne in air suspension in the direction of the lickerin section 12. The velocity of the air stream in the diffuser section, and hence in the cleaner duct following, is not a critical matter so far as efficient cleaning and opening is concerned, although it should be great enough to maintain the cotton in suspension throughout the apparatus. In general, we have found that air velocities somewhat higher than this bare minimum produce more satisfactory results.

The lickerin is rotated—counterclockwise in Fig. 1—in a manner which causes its blades to strike the masses of cotton downwardly and drag them lightly across the face of the perforated trash box cover 56, thereby further distending the masses of cotton by inertial stretching and subjecting them at the same time to a screening action which we have observed to remove the larger pieces of trash. It will be noted that the sloping face 52 of each blade of the lickerin rotor is shaped so that the fibres are not pounded against the cover plate, but are only gently scraped over it. To insure this we have provided as much as 1½ inches of clearance between the cover of the trash box and the lowermost point along the path of the blades without reducing the effectiveness of the cleaning action. The desired result is that the slightly rounded leading edge or toe 54 of a blade 51 strikes a portion of a mass of fibres, thereby tending to increase its momentum. The inertia of the remainder of the mass of cotton not positively engaged by the blade causes the fibres to be further stretched apart.

It is not the angular speed of the rotor, but the peripheral speed which is the significant factor. Where, as in this case, a 24 inch diameter rotor is used, we have found that an angular speed of 250 to 350 R. P. M. produces satisfactory cleaning. This speed of the rotor is, of course, effected by an appropriate selection of the driving and driven pulleys through which the rotor is driven by the V-belt.

The increased momentum imparted to the fibres by the lickerin rotor also assists the air stream in carrying them toward the discharge of the lickerin 12 and into the cleaner 13.

In the cleaner the inertial stretching action is further carried out by the succession of cleaner rotors, the blades of each rotor striking the masses of cotton, disentangling trash from their fibres, and propelling the cotton toward the next succeeding rotor. The constantly decreasing cross-section of the cleaner ducts results in an increased velocity of the air stream along them in the direction of the discharge opening. With this increase in velocity of the air stream and, consequently of the fibres, the blade tip velocity of the rotors is increased, thereby increasing the number and the intensity of the impacts on the fibres by each succeeding rotor.

Throughout the length of the duct, trash is removed from the cotton and falls through the perforated bottom plates into the underlying trash boxes. The overall result is a highly efficient opening and cleaning action which does the least amount of damage to the individual fibres.

While this description and the drawings referred to therein relate to but a single form of our invention, which apparatus is in actual operation, it is to be understood that our invention is not limited to this particular form, but is to be limited only by the scope of the subjoined claims.

We claim:

1. Apparatus for opening and cleaning compressed cotton fibres carried through said apparatus substantially in air suspension, which apparatus comprises in serial association an opener, a diffuser, a lickerin and a cleaner; said opener comprising a vertical trunk having a feed opening at its upper end and a discharge opening at its lower end and a plurality of spaced, horizontal grids disposed in said trunk, a plurality of rotatably mounted combs adapted to oscillate into and out of mesh with said grids, and trash boxes having foraminous covers disposed beneath said grid bars for the reception of trash separated from the cotton; said diffuser comprising a blower and a trunk for directing an enclosed air stream across the discharge opening of the opener; said lickerin comprising a casing, a fibre impelling rotor rotatably mounted in said casing, which rotor includes a shaft and a plurality of blades parallel to and radially spaced from said shaft, and a foraminous floor in said casing, the minimum distance between the floor of said casing and the outer extremes of the rotor blades being substantially equal to the average diameter of the masses of cotton, and means to turn said rotor in a direction to impel fibres entering the rotor casing from the diffuser trunk toward the cleaner; the cleaner comprising an elongated conduit having a rectangular cross-secion which constantly diminishes in the direction of flow of the fibres, a plurality of cleaner rotors transversely mounted in tandem within the conduit, each of said cleaner rotors including a shaft and a plurality of blades fixed radially of said shaft, each blade angularly spaced about said shaft from the blade adjacent thereto, and means for rotating each of said cleaner rotors at an angular velocity greater than the velocity of the rotor next preceding it; whereby compacted trashy fibres introduced to the apparatus at the feed opening of the opener section is carried substantially in air suspension through the trunk, casing, and conduit while being subjected to the combing, elongating and cleaning action of the several combs and rotors.

2. A fibre opening machine comprising a vertical casing having a feed opening in the top and a discharge opening at the bottom; a plurality of spaced horizontal grids fixed in said casing; a plurality of opener combs for each grid comprising elongated blades radially extending from shafts rotatably mounted adjacent and transversely of the grid and having their blades offset in relation to the grid to interstitially mesh therewith; the cross-section of each blade penpendicular to the length thereof having a lesser moment of inertia about an axis perpendicular to the shaft than about an axis parallel to the shaft; means adapted to oscillate the blades of the combs into and out of mesh with said grids; trash receptacles having foraminous covers disposed beneath said grids; whereby the reversal of direction of rotation of the oscillating combs causes the blades thereof elastically to deflect beyond their normal static positions at the ends of their arcs of oscillation.

3. A fibre opening machine comprising a vertical casing having a feed opening in the top and a discharge opening at the bottom; a plurality of spaced horizontal grids fixed in said casing; a plurality of bladed combs rotatably mounted adjacent and transversely of each of said grids and having their blades offset in relation to the grid to interstitially mesh therewith; means adapted to oscillate the blades of the combs into and out of mesh with said grids; trash receptacles having foraminous covers disposed beneath said grids; and means for inducing an air stream in the casing; whereby trashy masses of compressed cotton introduced through the said opening are agitated and distended by the oscillating combs and the cooperating grids, thereby releasing the entangled trash to fall into the trash receptacles while the distended masses of fibres pass out through the discharge opening.

4. A fibre opening machine according to claim 3 in which the means for inducing an air stream in the casing comprises a trunk for directing an enclosed air stream across the discharge opening, the trunk having a converging-diverging throat section adjacent the discharge opening, and a blower connected to the trunk on the converging side of the throat section.

5. A fibre cleaner comprising a duct of constantly decreasing rectangular cross-section and having a feed opening at its larger end and a discharge opening at its smaller end; a foraminous bottom in the duct; a trash receptacle beneath the bottom; a plurality of rotors transversely disposed and longitudinally spaced within the duct, each of which rotors comprises a plurality of radially extending blades spaced longitudinally of the rotor, each blade being angularly displaced about the rotor from the blade next adjacent; the diameter of each rotor being substantially equal to the height of the duct at the location of the rotor; means for rotating the rotors, each rotor having a higher peripheral velocity than the rotor next preceding it in the direction of the feed opening; and means for producing an air stream in the duct flowing toward the discharge opening thereof.

6. A fibre cleaner comprising a duct of constantly decreasing recatngular cross section and having a feed opening at its larger end and a discharge opening at its smaller end; a foraminous bottom in the duct; a trash receptacle beneath the bottom; a plurality of rotors transversely disposed and longitudinally spaced within the duct, each of said rotors comprising a plurality of radially extending blades spaced longitudinally of the rotor, the diameter of each rotor being substantially equal to the height of the duct at the location of the rotor; means for rotating the rotors, each rotor having a greater angular velocity than the rotor next preceding it in the direction of the feed opening; and means for producing an air stream in the duct flowing toward the discharge opening.

7. A fibre opening machine comprising a vertical casing having a feed opening at the top and a discharge opening at the bottom; a plurality of spaced horizontal grids fixed in said casing; a plurality of opener combs for each grid comprising elongated blades extending radially from shafts, said shafts being rotatably mounted immediately adjacent and transversely of the grid, the blades being offset in relation to the grid to permit the blades and grid to interstitially mesh in substantially parallel relation; means adapted to oscillate the blades of the combs into and out of mesh with said grids; trash receptacles having foraminous covers disposed beneath said grids; a trunk for directing an enclosed air stream across the discharge opening, the trunk having a converging-diverging throat section adjacent the discharge opening and a blower connected to the trunk on the converging side of the throat section; whereby trashy masses of compressed cotton fibres introduced through the said opening are carried downwardly in substantial air suspension and are agitated and distended by the oscillating combs and the cooperating grids, thereby releasing the entangled trash to fall into the trash receptacles while the distended masses of fibres pass out through the discharge opening.

8. A fibre opener comprising a substantially vertical casing having a feed opening at the top and a discharge opening at the bottom, a plurality of grids within said casing, each at a different elevation and each comprising a plurality of parallel, horizontally spaced bars; a plurality of opener combs for each grid, each comb comprising a shaft which is mounted for rotation about its axis which is disposed parallel to the plane of the grid and perpendicular to the individual bars thereof; each of said combs further comprising a plurality of blades fixed to and extending radially of the shaft, the length of the blades being substantially greater than the distance between the shaft of that comb and the associated grid; means adapted to oscillate the combs about the axes of their shafts such that portions of the blades travel through arcs extending above, through, and below the bars of the associated grid.

9. Apparatus for opening and cleaning trashy masses of compacted fibres comprising an enclosure, means for inducing an air stream to flow through the enclosure to carry the fibres therethrough substantially in air suspension, means in said enclosure adapted to increase instantly the momentum of a portion of each of the masses of fibres, in one portion of said enclosure said means comprising bladed members which oscillate substantially along the path of the fibres as they are carried through the enclosure, said blades being proportioned such that substantial portions thereof vibrate along the path of the fibres at each end of the oscillation of the blades, in another portion of said enclosure said means comprising a series of bladed rotating members disposed along the path of the fibres, each succeeding rotating member rotating faster than the preceding rotating members so that the momentum of the masses of fibres struck by the blades of each member is progressively increased as the fibres travel through the enclosure, thereby setting up inertial forces of increasing intensity between the individual fibres of each of the masses and causing the tangled fibres to distend and the trash to disentangle therefrom, the velocity of the air stream being such that the trash falls while the fibres continue in suspension therein.

10. Apparatus according to claim 9 in which said other portion of the enclosure is of progressively decreasing cross section, whereby the air velocity is progressively increased along the path of the fibres.

11. Apparatus for opening and cleaning trashy masses of compacted fibres comprising an enclosure, means in said enclosure adapted to increase instantly the momentum of a portion of each of the masses of fibres, said means comprising oscillating bladed members, said blades being proportioned such that at each end of the oscillation thereof a substantial portion of each blade vibrates generally along the path of oscillation, thereby setting up inertial forces between the individual fibres of each of the masses and causing the tangled fibres to distend and the trash to disentangle therefrom.

References Cited in the file of this patent

UNITED STATES PATENTS

| | | |
|---|---|---|
| 165,066 | Crane | June 29, 1875 |
| 656,107 | Graber | Aug. 14, 1900 |
| 708,133 | Franke | Sept. 2, 1902 |
| 1,129,902 | Reardon | Mar. 2, 1915 |
| 1,199,912 | Marquis et al. | Oct. 3, 1916 |
| 1,736,142 | Tomlinson | Nov. 19, 1929 |
| 1,953,536 | Knowles | Apr. 3, 1934 |
| 2,373,238 | Fanton et al. | Apr. 10, 1945 |